(12) United States Patent
Nishimoto (10) Patent No.: US 7,312,937 B2
(45) Date of Patent: Dec. 25, 2007

(54) LENS FEED MECHANISM (75) Inventor: Naoki Nishimoto, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/510,677

(22) Filed: Aug. 28, 2006

(65) Prior Publication Data

US 2007/0047107 A1   Mar. 1, 2007

(30) Foreign Application Priority Data

Aug. 29, 2005   (JP) .......................... P2005-248102

(51) Int. Cl.
*G02B 7/02* (2006.01)
(52) U.S. Cl. .................. 359/811; 359/813; 359/819; 359/821; 359/822
(58) Field of Classification Search ............. 359/811, 359/813, 819, 822, 823, 821
See application file for complete search history.

(56) References Cited

U.S. PATENT DOCUMENTS

2002/0106205 A1   8/2002   Kikuchi et al.

2003/0095337 A1   5/2003   Tu et al.
2004/0247306 A1   12/2004   Jeong et al.
2005/0168847 A1   8/2005   Sasaki

FOREIGN PATENT DOCUMENTS

JP   11-264925 A   9/1999

*Primary Examiner*—Ricky Mack
*Assistant Examiner*—Brandi Thomas
(74) *Attorney, Agent, or Firm*—Birch, Stewart, Kolasch & Birch, LLP (57) ABSTRACT

A lens feed mechanism is provided and includes: a lens frame that holds a movable lens and that is supported by a fixed lens barrel so as to be capable of moving in a direction in which the movable lens is to move; a feed screw supported rotatably on an axis extending in a moving direction of the lens frame; and a connecting unit that connects the lens frame with the feed screw, the connecting unit having a rack mechanism supported rotatable on an axis extending in a direction on a plane orthogonal to the moving direction of the lens frame, the connecting unit engaging with the feed screw.

15 Claims, 6 Drawing Sheets

LENS FEED MECHANISM

FIELD OF THE INVENTION

The present invention relates to lens feed mechanisms, and more particularly to a lens feed mechanism which is adapted to advance and retract a movable lens in the direction of the optical axis by a motor, for focusing or zooming adjustment in a lens barrel for use in a video camera, monitor camera or the like.

BACKGROUND OF THE INVENTION

For example, in the lens barrel of a monitor camera, a movable lens for focus adjustment is arranged movable in the optical-axis direction. By changing the position of the movable lens on motor power, focus adjustment is to be performed.

As for the lens feed mechanism arranged to move a movable lens in the optical-axis direction on motor power in order to perform a focus adjustment or so, there is generally included a structure as described in JP-A-11-264925. In JP-A-11-264925, the movable lens is held in a lens frame. The lens frame is slidably supported over a guide rod fixed to the fixed lens barrel and extending in the optical-axis direction so that the lens frame, together with the movable lens, can be guided in the optical-axis direction along the guide rod.

Meanwhile, a motor-rotated feed screw is provided parallel with the guide rod and in the optical axis direction. The lens frame is connected to the feed screw through a connecting unit (driver in JP-A-11-264925). The connecting unit has one end connected swingably to the lens frame on the axis in the optical axis direction, and the other end formed with a rack mechanism engaging on the feed screw in a manner clamping the feed screw.

When the feed screw is rotated by the motor, the connecting unit is moved forward and backward in the optical-axis direction by the rack mechanism. In conjunction therewith, the lens frame connected to the connecting unit and the movable lens held in the lens frame are moved forward and backward in the optical-axis direction.

However, in the background art, the connecting unit is formed in one body as in JP-A-11-264925. Consequently, there is a need to accurately arrange the guide rod to guide the lens frame in the optical-axis direction as well as the feed screw to be rotated by the motor. When the feed screw is arranged inaccurately and hence the parallelism is low between the guide rod and the feed screw, the lens frame is acted with a force in a direction deviated from the guide rod. Consequently, the movable lens held in the lens frame has its optical axis deviating from the proper optical axis of the optical system overall, possibly incurring the lowering of optical characteristic. Besides, an increase of load between the lens frame and the guide rod occurs, possibly causing a malfunction or giving an adverse effect upon durability.

SUMMARY OF THE INVENTION

An object of an illustrative, non-limiting embodiment of the invention is to provide a lens feed mechanism moving, by a feed screw, a movable lens forward and backward in the direction of the rotary axis of the feed screw, the lens feed mechanism being capable of smoothly moving a movable lens freely from causing a malfunction or giving an adverse effect upon durability and freely from incurring the lowering of optical characteristic even when a feed screw arrangement accuracy is poor.

According to an aspect of the invention, there is provided (1) a lens feed mechanism including: a lens frame that holds a movable lens and that is supported by a fixed lens barrel so as to be capable of moving in a direction in which the movable lens is to move; a feed screw supported rotatably on an axis extending in a moving direction of the lens frame; and a connecting unit that connects the lens frame with the feed screw, the connecting unit having a rack mechanism supported rotatable on an axis extending in a direction on a plane orthogonal to the moving direction of the lens frame, the connecting unit engaging with the feed screw.

According to an aspect of the invention, even when the feed screw arrangement accuracy is poor and hence the feed screw is arranged in a direction not coincident with accuracy with the moving direction of the lens frame, the rack mechanism engaged with the feed screw has a rotation angle automatically adjusted to a direction of the feed screw. This relieves the unwanted force caused on the lens frame due to a directional deviation of the feed screw from the moving direction of the lens frame, thus preventing the lowering of optical characteristic, malfunction and the adverse effect upon durability. Meanwhile, because the rack mechanism abuts at a proper angle against the feed screw, backlash is less likely to occur. The positional accuracy is high as to the lens frame set up relative to the rotational position of the feed screw.

(2) The lens feed mechanism according to the above (1), wherein the connecting unit is connected to the lens frame rotatably on an axis extending in the moving direction of the lens frame.

According to a lens feed mechanism of the above (2), the rotary axis of the rotatable rack mechanism can be adjusted in position on the plane orthogonal to the moving direction of the lens frame. This, therefore, relieves the unwanted force caused on the lens frame due to a directional deviation of the feed screw on the plane orthogonal to the moving direction of the lens frame.

(3) The lens feed mechanism according to the above (1) or (2), wherein the rack mechanism comprises two rack members facing each other and sandwiching the feed screw, one of the two rack members being supported rotatable on the axis extending in the direction on the plane orthogonal to the moving direction of the lens frame, the other of the two rack members being formed integral with a portion of the connecting unit, the portion connecting to the lens frame.

According to a lens feed mechanism of the above (2), when the rack mechanism and the feed screw are engaged together in a manner in which the opposite two rack members sandwich the feed screw, any one of the rack members only is provided rotatable. Due to this, in the case that the both rack members are provided rotatable for the portion connected to the lens frame in the connecting unit, it is possible to prevent the malfunction due to the backlash possibly caused between the connected portion and the rack members.

(4) The lens feed mechanism according to the above (3), wherein one of the two rack members is less elastically deformable than the other of the two rack members.

According to a lens feed mechanism of the above (3), one of the two rack members facing the other rack member is less elastically deformable, and the lens frame is accurately positioned relative to the rotational position of the feed screw. The other rack member is used to apply a biasing force for clamping the feed screw, due to the elastic deformation thereof.

(5) The lens feed mechanism according to the above (4), wherein one of the two elastical members, which is less elastically deformable, is supported rotatable on the axis extending in the direction on the plane orthogonal to the moving direction of the lens frame.

According to a lens feed mechanism of the above (5), by providing a rotatable rack member, among the two rack members facing each other, as the less elastically deformable one, the less elastically deformable rack member is to abut at a proper angle against the feed screw in accordance with the direction of the feed screw. This therefore relieves the unwanted force caused on the lens frame due to a directional deviation of the feed screw from the moving direction of the lens frame.

In a lens feed mechanism according to an aspect of the invention, even when the feed screw arrangement accuracy is poor, the movable lens is allowed to move without causing a malfunction or giving an adverse effect upon durability and without incurring the lowering of optical characteristic.

DETAILED DESCRIPTION OF THE INVENTION

In accordance with the accompanying drawings, explanation is now made in detail on a lens feed mechanism according to an exemplary embodiment of the present invention.

Figure 1:
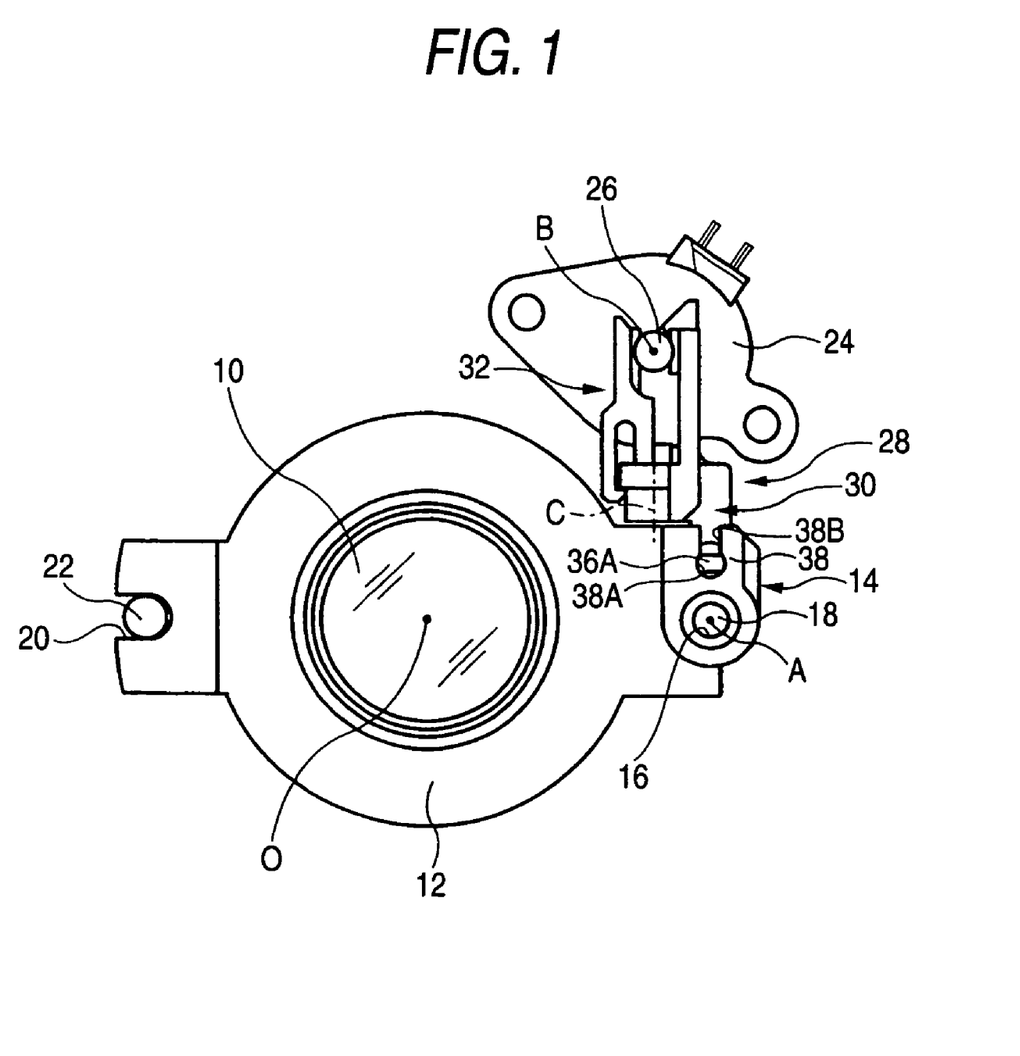
FIG. 1 is a front view showing a construction of a lens feed mechanism according to an exemplary embodiment of the invention.
Figure 2:
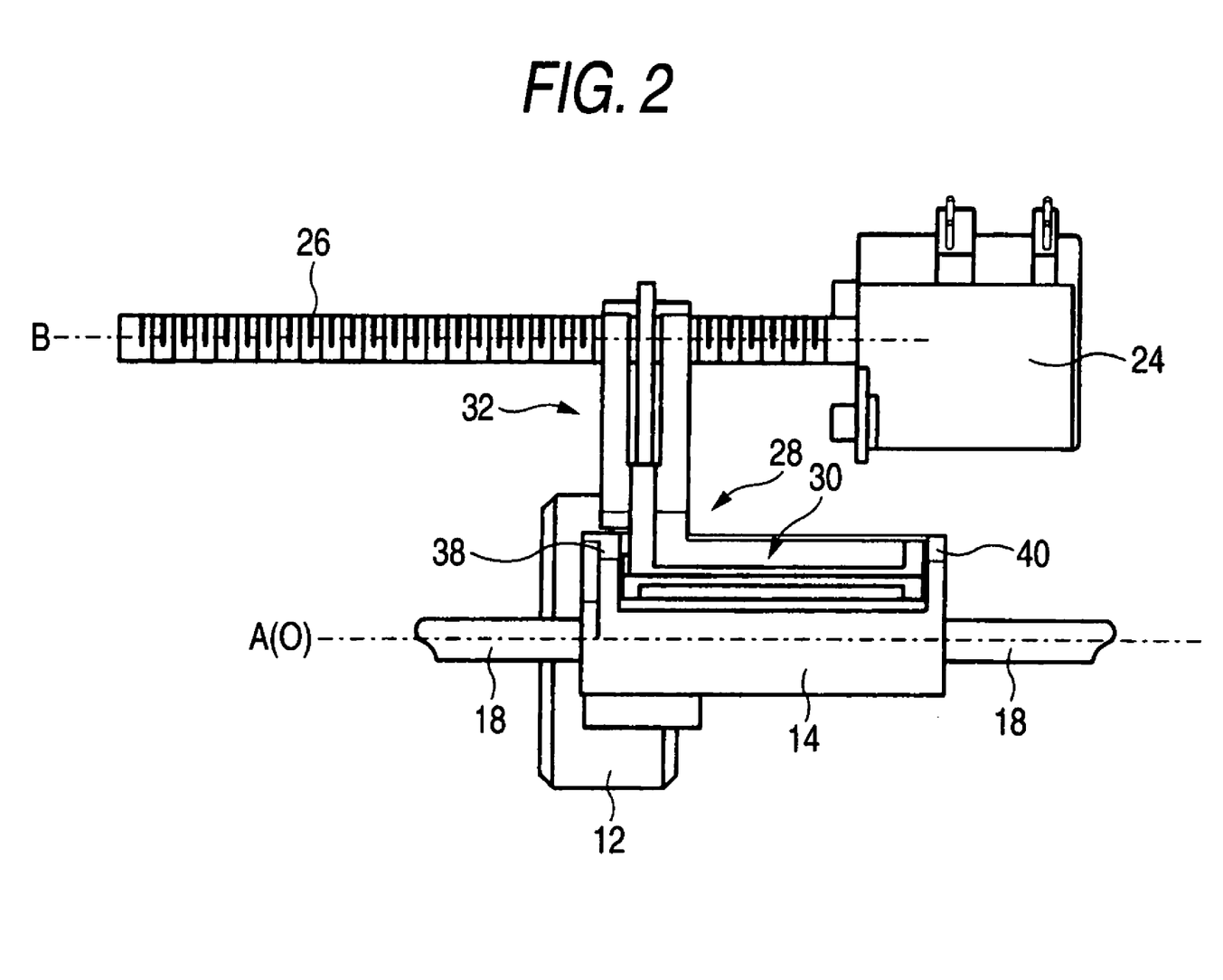
FIG. 2 is a side view showing a construction of a lens feed mechanism according to an exemplary embodiment of the invention.

FIGS. 1 and 2 are front (view illustrated in the direction of an optical axis) and side views, respectively, showing a construction of a lens feed mechanism to which an aspect of the invention is applied. In the figures, a movable lens 10 is shown which lens is arranged as a focus-adjusting lens movable in the optical-axis direction O of the lens barrel overall, such as, in the lens barrel of a monitor camera. The movable lens 10 is supported in a lens frame 12.

The lens frame 12 includes a bearing 14 extending in the optical-axis direction O, in the right as viewed from front. The bearing 14 is formed with a bore 16 through which a first guide rod 18 is slidably received. In the left of the lens frame 12 as viewed from the front thereof, a U-groove 20 is formed. In the U-groove 20, a second guide rod 22 is slidably received. The first and second guide rods 18, 20 are attached on a fixed lens barrel, not shown, thus assuming a direction parallel with the optical-axis direction O. The lens frame 12 is supported on the guide rods 18, 22, to move forward and backward in the direction in which the movable lens 10 is to move. Incidentally, the moving direction of the lens frame 12 is coincident with the direction of the axis A of the guide rod 18, i.e. the guide rod 18 is fixed on the fixed lens barrel such that the axis A is coincident with the optical axis O.

In the fixed lens barrel not shown, there is arranged an actuator 24, such as a stepping motor, having its output shaft to which a feed screw 26 is connected. The feed screw 26 is attached on the fixed lens barrel such that its axis B is coincident in direction with the axis A of the guide rod 18 (in the optical-axis direction O), and supported rotatable about the axis B.

The feed screw 26 and the lens frame 12 are connected together by a connecting unit 28, detailed later. The connecting unit 28 has one end (base) formed with an attachment portion 30 to be attached to the lens frame 12 and the other end (tip) formed with a rack mechanism 32 for engagement with the feed screw 26 in a manner clamping the feed screw 26. When the feed screw 26 is rotated by the actuator 24, the connecting unit 28 moves in the optical-axis direction O. In conjunction therewith, the lens frame 12 and the movable lens 10 held in the lens frame 12 are guided along the guide rods 18, 22 and moved in the optical-axis direction O.

Figure 3:
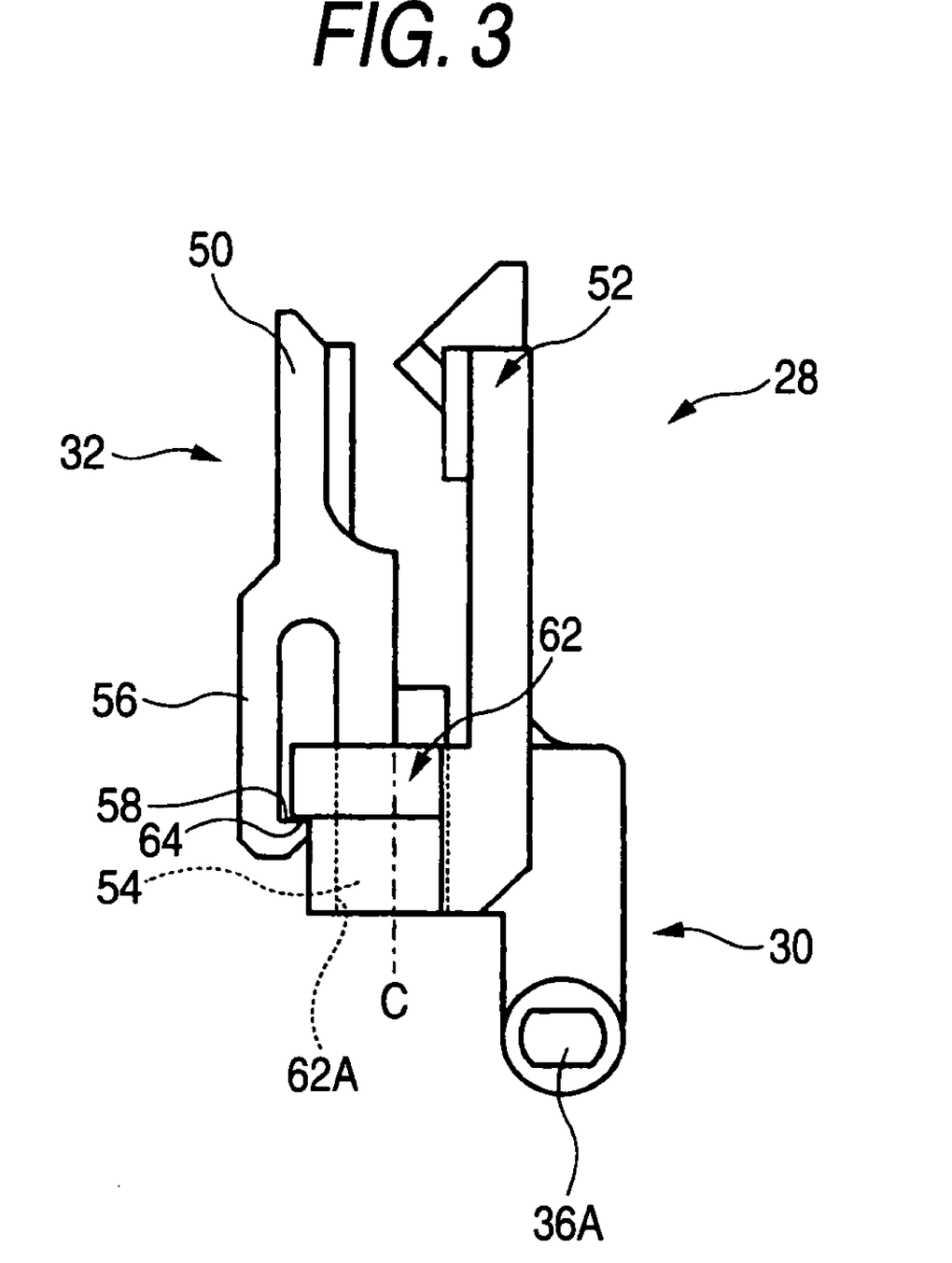
FIG. 3 is a front view showing a connecting unit according to an exemplary embodiment of the invention.
Figure 4:
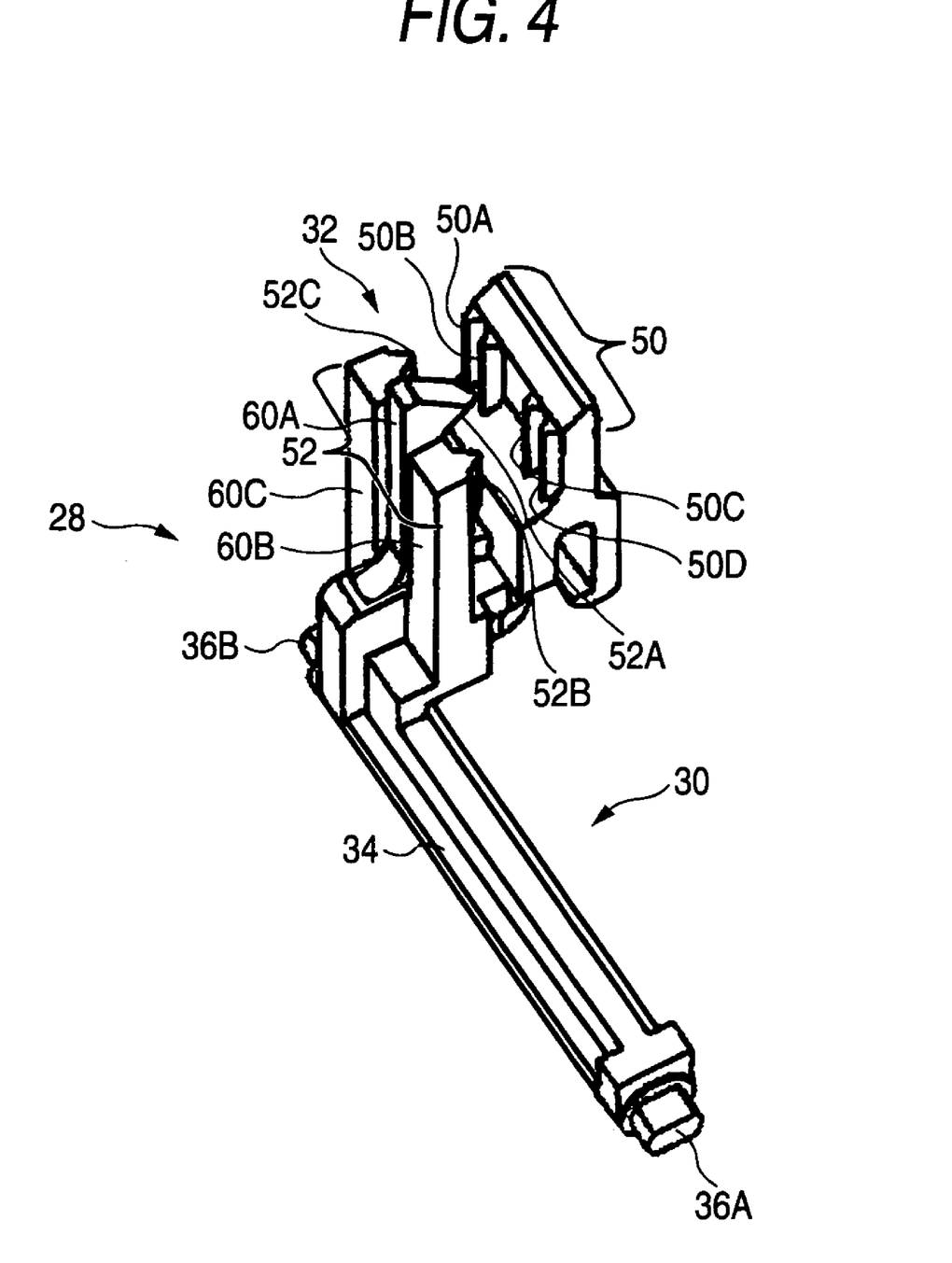
FIG. 4 is a perspective view showing a connecting unit from obliquely upper left in back thereof according to an exemplary embodiment of the invention.
Figure 5:
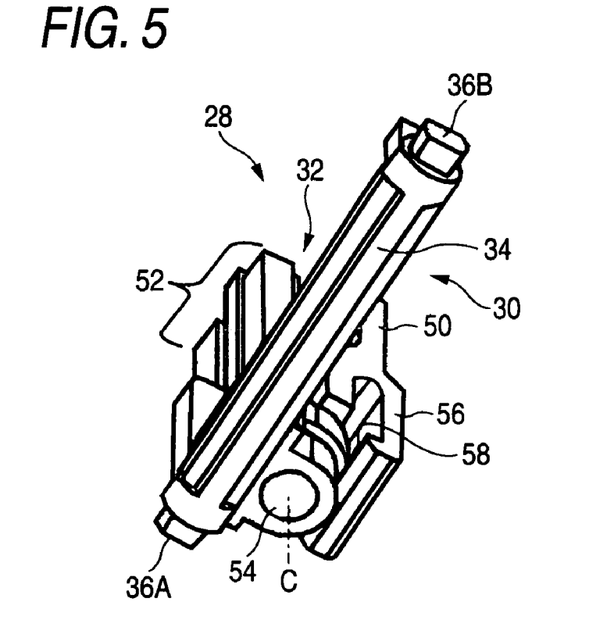
FIG. 5 is a perspective view showing a connecting unit from obliquely lower left in back thereof according to an exemplary embodiment of the invention.

FIGS. 3, 4 and 5 are a front view showing the connecting unit 28 from front (in the optical-axis direction O), a perspective view showing the same from obliquely above in back, and a perspective view showing the same in a direction obliquely below from back, respectively. As shown in the figures, the connecting unit 28 includes an attachment portion 30 and a rack mechanism 32. The attachment portion 30 includes an elongate portion 34 extending backward and having ends, at the front and back thereof, where engaging projections 36A, 36B each has a shape, in section, horizontally cut a circle of its upper and lower portions.

Meanwhile, in FIGS. 1 and 2, a cavity is formed in the bearing of the lens frame 12, in a position upper than the position where to insert the guide rod 18. The cavity has a front wall 38 formed with a circular engaging hole 38A as shown in FIG. 1. Furthermore, a grooved hole 38B, having a width smaller than the diameter of the engaging hole 38A, continues from the engaging hole 38A to the upper end of the wall 38. In the back wall 40 of the cavity, engaging and grooved holes (not shown) are formed similarly to those of the front wall 38.

By inserting the engaging projection 36A (and 36B) of the attachment portion 30 of the connecting unit 28 in the grooved hole 38B of the bearing 14 of the lens frame 12 at from the side surfaces narrower in width (curve surfaces), the engaging projection 36A moves to the engaging hole 38A, and the elongate portion 34 of the attachment portion 30 is received in the cavity of the bearing 14. In this state, when the connecting unit 28 is rotated about the engaging projection 36A, 36B, the engaging projection 36A goes into engagement with the engaging hole 38A. Due to this, the connecting unit 28 is rotatably connected to the lens frame 12 about the axis extending in the optical axis O (axis A of the guide rod 18).

The rack mechanism 32 of the connecting unit 28 includes a wall rack 50 and a biasing rack 52, as shown in FIGS. 3 to 5. The biasing rack 52 is formed integral with the attachment portion 30 of the connecting unit 28 whereas the wall rack 50 is structured by a member separate from the biasing rack 52 and attachment portion 30.

The wall rack 50 is less elastically deformable as compared to the biasing rack 52. By mainly elastically deforming the biasing rack 52, the feed screw 26 at its tip can be inserted between the wall rack 50 and the biasing rack 52. Due to the elastic force caused by elastic deformation of the biasing rack 52, a biasing force acts toward sandwiching the feed screw 26. This places the rack teeth 50A-50D (FIG. 4) formed in the wall rack 50 (see FIG. 4) and the rack teeth 52A-52C (see FIG. 4) formed in the biasing rack 52 into mesh with the thread of the feed screw 26. In one embodiment, the wall rack 50 and the biasing rack 52 may be different in elastic deformability (non-deformability) depending upon the materials of the members structuring the respective racks, or upon a structure (form) such as member thickness. Meanwhile, in another embodiment, elastic deformability may not necessarily be different between the wall rack 50 and the biasing rack 52.

Figure 6A:
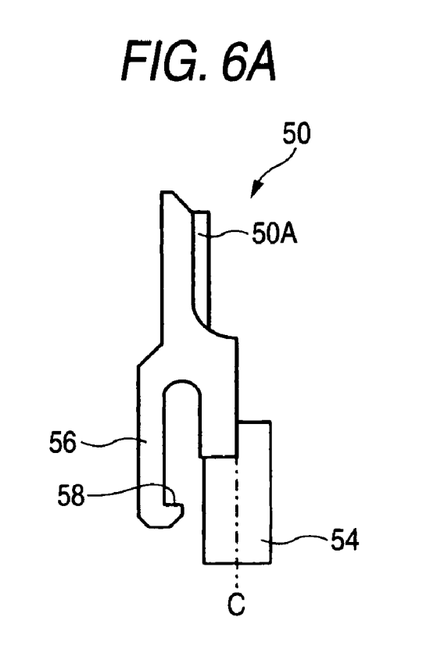
FIG. 6A is a front view showing a wall rack in a state where the wall rack is removed from a biasing rack and an attachment portion.
Figure 6B:
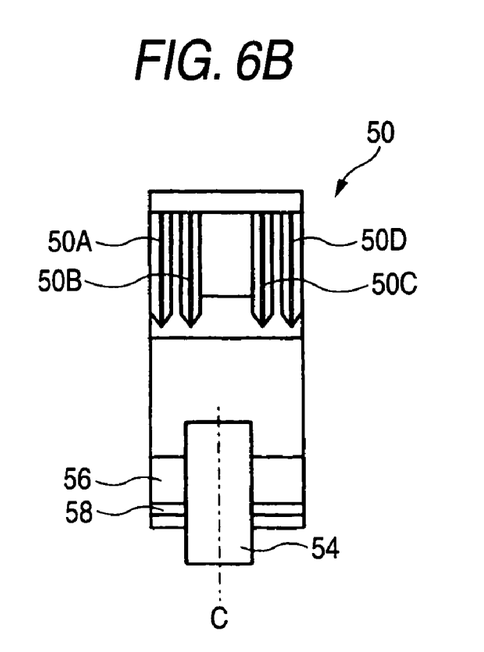
FIG. 6B is a side view showing same from the side of teeth to be in mesh with a feed screw according to an exemplary embodiment of the invention.

FIGS. 6A and 6B are a front view showing, from front (in the optical-axis direction O), the wall rack 50 in a state removed from the biasing rack 52 and attachment portion 30, and a side view showing the same from the side of the teeth to be in mesh with the feed screw 26. As shown in the figure, the wall rack 50 has a teethed surface in the upper side of which are formed four rack teeth 50A-50D to be in mesh with the thread of the feed screw 26. In the lower side of the teethed surface of the wall rack 50, a cylindrical rod 54 is formed.

Meanwhile, an engaging portion 56 extends in the opposite surface to the teethed surface of the wall rack 50. A convex 58 is formed at an end of the engaging portion 56.

Figure 7A:
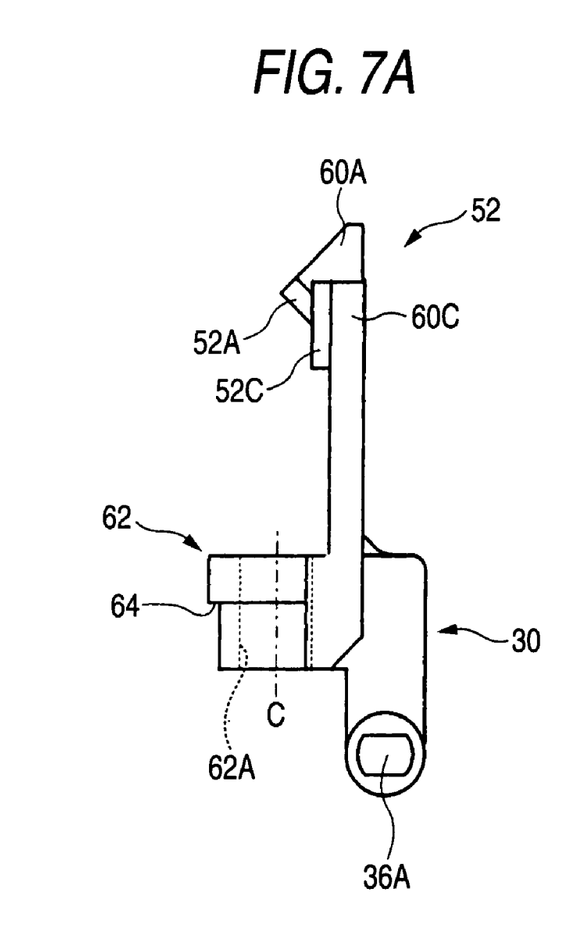
FIG. 7A is a front view showing a biasing rack and an attachment portion in a state where a wall rack is removed.
Figure 7B:
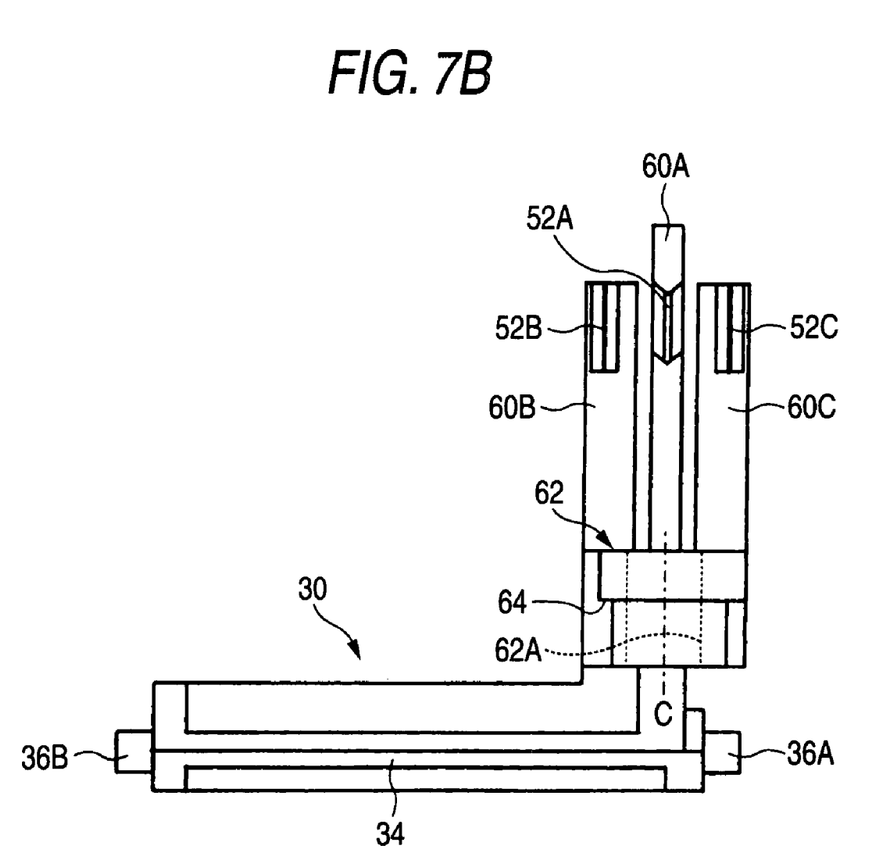
FIG. 7B is a side view showing the same from the side of teeth to be in mesh with the feed screw according to an exemplary embodiment of the invention.

FIGS. 7A and 7B are a front view showing, from front, the biasing rack 52 and attachment portion 30 in a state in which the wall rack 50 is removed, and a side view showing the same from the side of the teeth to be in mesh with the feed screw 26. As shown in the figure, the biasing rack 52 and the attachment portion 30 are formed in one body. The biasing rack 52 is structured with three protuberances 60A, 60B, 60C. The protuberances 60A-60C are formed with rack teeth 52A-52C. The rack tooth 52A in the central protuberance 60A is formed in an inclining direction, to abut against the teethed surface of the feed screw 26 from obliquely above thereof.

In the lower of the biasing rack 52, an engaging portion 62 is formed wherein an engaging hole 62A is formed through the engaging portion 62. When the rod 54 of the wall rack 50, shown in FIGS. 6A and 6B, is inserted in the engaging hole 62A, the convex 58 of the engaging portion 56 of the wall rack 50 is placed in engagement with the step 64 formed in the engaging portion 62 of the biasing rack 52. Thus, the wall rack engages with the engaging portion 62 of the biasing rack 52 by the action of snap-in.

Due to this, the wall rack 50 is attached to the biasing rack 52 rotatably about the axis C of the rod 54 (axis C of the engaging portion 62A of the biasing rack 52) of the wall rack 50, thus constituting a rack mechanism 32 so that the wall rack 50 and the biasing rack 52 at their teethed surfaces are opposed to each other.

Using the connecting unit 28 thus structured, explanation is made on the operation and effect in the case the lens frame 12 and the feed screw 26 are connected together as shown in FIGS. 1 and 2.

As noted before, the guide rods 18, 22 and the feed screw 26 are attached on the fixed lens barrel, ideally parallel with the optical axis O. In FIGS. 1 and 2, arrangement is made coincident at least between the axis A of the guide rod 18 (moving direction of the lens frame 12) and the axis B of the feed screw 26. In a lens feed mechanism of the background art, unless the guide rod 18 and the feed screw 26 are not coincident in direction at their axis A and axis B with accuracy, the lens frame 12 is acted upon by a force in a different direction from the moving direction (in the axis-A direction), which possibly incurs the lowering in optical characteristic, the improperness in operation or the bad effect upon endurance. However, where using the connecting unit 28 in the embodiment, even in case the guide rod 18 and the feed screw are not coincident in direction at their axes A and B with accuracy, the lens frame 12 can be mobbed forward and backward along the guide rod 18 without incurring such a malfunction as encountered in the conventional art.

Namely, the rotary axis C of the wall rack 50 lies on the plane orthogonal to the axis A of the guide rod 18 (moving direction of the lens frame 12), on which plane the rotary axis C changes in position depending upon the rotation angle of the connecting unit 28 rotating about the axis A of the guide rod 18 relative to the lens frame 12. Accordingly, the connecting unit 28 is automatically adjusted in its rotation angle depending upon the position of the feed rod 26 intersecting with the plane including the rotary axis C and orthogonal to the axis A. In case there are deviations in the feed screw 28 position, the rack mechanism 32 is adjusted in a proper position where engaged with the feed screw 26.

Meanwhile, the wall rack 50 of the rack mechanism 32 is adjusted in its rotation angle about the rotary axis C depending upon the direction of the axis B of the feed screw 26. Unless the axis A of the guide rod 18 and the axis B of the feed screw are not coincident in direction, the teethed surface of the wall rack 50 horizontally abuts against the feed screw 26. Accordingly, by the non-coincidence in direction between the axis A of the guide rod 18 and the axis B of the feed screw, the force acting in the other direction than the axis A of the guide rod 18 on the lens frame 12 is reduced, thus smoothly moving the lens frame 12 forward and backward along the guide rod 18. Meanwhile, due to the rotation of the wall rack 50, the wall rack 50 at its toothed surface abuts, at a proper angle, against the feed screw, hence there occurring less backlash between the rack mechanism 32 and the feed screw 26. Thus, there is a merit that the positional accuracy is high in the axis A direction of the lens frame 12 relative to the rotation position of the feed screw 26.

As described above, in the present embodiment, the connecting unit 28 has a rack mechanism 32 made up by the wall rack 50 and the biasing rack 52 separately wherein the biasing rack 52 is integrally formed with the attachment portion 30 where to connect the biasing rack 52 to the lens frame 12. However, the wall rack 50 and the biasing rack 52 may be formed in one body so that the rack mechanism overall constituted by those can be arranged rotatable relative to the attachment portion 30. Nevertheless, in the case the wall rack 50 and the biasing rack 52 are both arranged rotatable relative to the attachment portion 30, there is a possibility that the positional accuracy of the lens frame 12 is lowered relative to the rotation position of the feed screw 26 due to the backlash at the connecting unit thereof. At least one of the wall rack 50 and the biasing rack 52 is desirably formed integrally with the attachment portion 30. Meanwhile, when the wall rack 50 less elastically deformable is formed integral with the attachment portion 30 and the biasing rack 52 highly elastically deformable is formed as a separate member from the attachment portion 30 and wall rack 50, the less elastically deformable wall rack 50 is acted with a force in a direction other than the axis A which force is readily conveyed directly to the lens frame 12 because of the coincidence in direction between the axis B of the feed screw 26 and the axis A of the guide rod 18. Therefore, the rack arranged rotatable is desirably provided by the wall rack 50.

A lens feed mechanism according to an aspect of the invention is applicable as a lens feed mechanism that is to move the lens for a desired purpose, thus not being limited to a lens feed mechanism that is to move the lens for the purpose of focusing or zooming.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. 2005-248102 filed Aug. 29 of 2005, the contents of which are incorporated herein by reference.

What is claimed is:

1. A lens feed mechanism comprising:
   a lens frame that holds a movable lens and that is supported by a fixed lens barrel so as to be capable of moving in a direction in which the movable lens is to move;
   a feed screw supported rotatably on an axis extending in a moving direction of said lens frame; and
   a connecting unit that connects said lens frame with said feed screw, said connecting unit having a rack mechanism supported rotatable on an axis extending in a direction on a plane orthogonal to the moving direction of said lens frame, said connecting unit engaging with said feed screw,
   wherein a rotation angle for the rack mechanism is automatically adjusted depending upon the position of the intersection of said feed screw with the plane, so that a side force on said lens frame is reduced when the axis of said feed screw is not parallel with the direction in which the movable lens is to move.

2. The lens feed mechanism according to claim 1, wherein said connecting unit is connected to said lens frame rotatably on an axis extending in the moving direction of said lens frame.

3. The lens feed mechanism according to claim 1, wherein the rack mechanism comprises two rack members facing each other and sandwiching said feed screw, one of the two rack members being supported rotatable on the axis extending in the direction on the plane orthogonal to the moving direction of said lens frame, the other of the two rack members being formed integral with a portion of said connecting unit, the portion connecting to said lens frame.

4. The lens feed mechanism according to claim 3, wherein one of the two rack members is less elastically deformable than the other of the two rack members.

5. The lens feed mechanism according to claim 4, wherein one of the two elastically deformable rack members, which is less elastically deformable, is supported rotatable on the axis extending in the direction on the plane orthogonal to the moving direction of said lens frame.

6. A lens feed mechanism comprising:
   a lens frame adapted to hold a movable lens and being supported by a fixed lens barrel, wherein said lens frame is capable of moving in a direction substantially parallel to an optical axis;
   a feed screw rotatably supported on a second axis; and
   a connecting unit connecting said lens frame with said feed screw, said connecting unit having a rack mechanism rotatably supported on a third axis extending in a plane substantially orthogonal to the moving direction of said lens frame, said connecting unit engaging with said feed screw,
   wherein a rotation angle for the rack mechanism is automatically adjusted depending upon the position of the intersection of said feed screw with the plane, so that a side force on said lens frame is reduced when the second axis is not parallel with the optical axis.

7. The lens feed mechanism according to claim 6, wherein said connecting unit is connected to said lens frame rotatably on an axis substantially parallel with the moving direction of said lens frame.

8. The lens feed mechanism according to claim 6, wherein the rack mechanism comprises two rack members facing each other and adapted to receive said feed screw between them, one of the two rack members being rotatably supported on the third axis, the other of the two rack members being integrally connected to a portion of said connecting unit, the portion connecting to said lens frame.

9. The lens feed mechanism according to claim 8, wherein one of the two rack members is less elastic than the other rack member.

10. The lens feed mechanism according to claim 9, wherein the less elastic one of the two rack members is adapted to rotate on said third axis.

11. A lens feed mechanism comprising:
    a lens frame adapted to hold a movable lens and being supported by a lens barrel, wherein said lens frame is capable of moving in a direction substantially parallel to an optical axis;
    a feed screw adapted to rotate on a second axis; and
    a connecting unit connecting said lens frame with said feed screw, said connecting unit having a rack mechanism comprising a first and a second rack members, wherein the first rack member is adapted to rotatably move with respect to the second rack member, the first and second rack members engaging with said feed screw,
    wherein a rotation angle for the first rack member is automatically adjusted depending upon the direction of said second axis, so that a side force on said lens frame is reduced when the second axis of said feed screw is not parallel with the optical axis.

12. The lens feed mechanism according to claim 11, wherein said connecting unit is rotatably connected to said lens frame on an axis substantially parallel with the moving direction of said lens frame.

13. The lens feed mechanism according to claim 11, wherein the first rack member is adapted to rotate on a third axis included in a plane substantially orthogonal to the moving direction of said lens frame, and the second rack member is integrally connected to a portion of said connecting unit.

14. The lens feed mechanism according to claim 11, wherein one of the two rack members is less elastic than the other rack member.

15. The lens feed mechanism according to claim 14, wherein the less elastic of the two rack members is adapted to rotate on a third axis included in a plane substantially orthogonal to the moving direction of said lens frame.

* * * * *